United States Patent [19]
Nakatani et al.

[11] Patent Number: 6,153,847
[45] Date of Patent: Nov. 28, 2000

[54] WELDING MEMBER AND WELDING METHOD

[75] Inventors: Tatsuo Nakatani; Toru Iwasaki; Mitsuru Komori; Norio Tezuka; Yoshiaki Matsumoto, all of Ichihara; Kazuhiro Fukuda, Tokyo; Toshikazu Inaba, Ichihara, all of Japan

[73] Assignee: Mitsui Engineering & Shipbuilding Company, Japan

[21] Appl. No.: 09/044,848

[22] Filed: Mar. 20, 1998

[30] Foreign Application Priority Data

| Jun. 6, 1997 | [JP] | Japan | 9-148986 |
| Jun. 6, 1997 | [JP] | Japan | 9-148987 |
| Dec. 5, 1997 | [JP] | Japan | 9-335481 |
| Jan. 29, 1998 | [JP] | Japan | 10-017085 |

[51] Int. Cl.[7] .................................................. B23K 13/06
[52] U.S. Cl. ........................................ 219/72; 219/146.52
[58] Field of Search ...................... 219/72, 73, 137 WM, 219/146.52, 73.11, 145.23, 146.1, 146.31; 148/22, 23, 24; 524/544

[56] References Cited

U.S. PATENT DOCUMENTS

| 3,662,144 | 5/1972 | DeHaeck | 219/73 |
| 4,335,755 | 6/1982 | Sadler et al. | 138/145 |
| 5,032,641 | 7/1991 | Nanishi et al. | 524/544 |
| 5,225,661 | 7/1993 | Chai et al. | 219/145.22 |

FOREIGN PATENT DOCUMENTS

| 48-49 | 1/1973 | Japan. |
| 1-233093 | 9/1989 | Japan. |

*Primary Examiner*—Patrick Ryan
*Assistant Examiner*—M. Alexandra Elve
*Attorney, Agent, or Firm*—Parkhurst & Wendel, L.L.P.

[57] ABSTRACT

A water-repellent film is applied on to the surface of a welding member such as of a welding backing member disposed backside a joint defined between two mating welding bevels, a welding bevel of a base member to be welded, and a coated welding rod formed by coating a metallic core wire with a flux. The water-repellent film is formed of a hydrophobic material having a contact angle of 90° or above and providing minute concavities and convexities. In a highly humid environment, during rainfall or in water, welding can be effected without weld defects such as blow holes, cracks and the like.

12 Claims, 17 Drawing Sheets

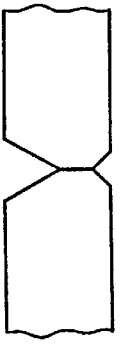
FIG.17A I-TYPE
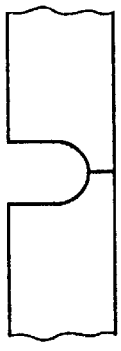
FIG.17B U-TYPE
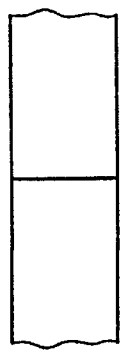
FIG.17C X-TYPE
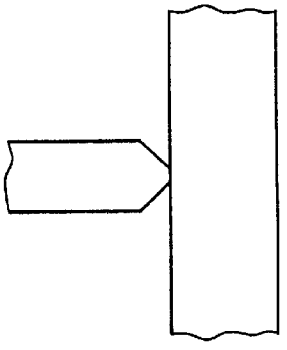
FIG.17D H-TYPE
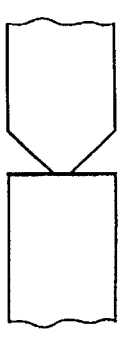
FIG.17E K-TYPE
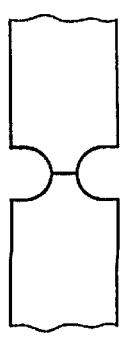
FIG.17F T-TYPE

WELDING MEMBER AND WELDING METHOD

BACKGROUND OF THE INVENTION

1. Field of the Invention

The present invention relates to welding members such as of a welding backing member, a coated welding rod, a welding bevel and the like, and in particular to welding members suited for welding in highly humid environment, during rainfall or in water. The invention also relates to a wet underwater welding method which enables welding to be effectively effected in a highly humid or underwater atmosphere.

The welding member and underwater welding method according to the present invention can be suitably applied, for instance, to wet underwater welding for marine structures in respect of ocean jointing, underwater repairing and maintenance and the like. Those marine structures include for example petroleum production facilities, loading and unloading facilities, storage facilities, sea airports, sea stockpiling bases, bridges, submarine tunnels, electricity generation facilities of a wave-tide-temperature difference system, ocean corrals and the like.

In addition, the welding member and welding method of the invention are useful for land welding of such steel structures as of ships, bridges and the like.

2. Description of the Related Art

In wet underwater welding, a certain backing member has heretofore been used which is formed of the same material (common metal) as that employed in an area to be welded and welded integrally to that welding area. With respect to a backing member for use in wet underwater welding as being removable after welding, those researches thus far done are directed solely to a method in which a metal backing member made of steel is put to use.

On the other hand, a ceramic material for example is known for use as a backing member in land welding. This ceramic backing member is usually made to be of a short length and hence is used in plural array along a weldline. The backing member before use is usually dried in a drying oven.

The conventional backing members noted above are encountered with the following problems.

(1) In the Case of Use of a Common Metal for a Backing Member in Wet Underwater Welding:

Since the resultant backing member gets remained on a welded area, painting or other treatment cannot be applied to the surface of the welded area having such backing member superimposed thereon. A marine structure in particular poses the problem that gap corrosion occurs between the welded area and the backing member. In such instance, the gap corrosion should be prevented by disposing a sacrifice anode in proximity to the backing member and then by allowing the anode to be corroded.

Moreover, a welded joint with the backing member remaining thereon reveals a fatigue resistance of about 80% as against the counterpart of a completely melted uranami welded joint using a ceramic backing material or the like that permits removal after welding. In consequence, when care is taken of fatigue as to a starting material to be welded, the plate thickness is required to be large. This is responsible for added material cost and increased production cost.

(2) In the Case of Use of a Copper Backing Member in Wet Underwater Welding:

Even with use of a copper backing member which is removable after welding, underwater welding is possible. The finished back bead, however, involves rather a rough surface and thus results in reduced fatigue strength of the resultant welded area.

Additionally, since the copper backing member is provided therein with a conduit for flow of cooling water, the same is usually large in length and inflexible in nature. The copper backing member fails to favorably follow joint variance or deformation of two mating members to be butt-welded with the result that a melted metal intrudes into a gap between the backing member and the members to be welded. Thus, the resulting back bead is often susceptible to unacceptable shaping. In such case, strict precision is required in bringing the mating welding members into accurately butted relation to each other, coupled with extra time and cost in preparation for welding. The copper backing member is so structured as to have disposed therein a cooling water conduit as mentioned above.

Joining of copper backing members of a short length to each other results in complicated structure and inconvenient handling.

(3) In the Case of Use of a Seramic Backing Member in Common Use for Land Welding in Wet Underwater Welding:

A ceramic backing member obtained in commerce is used with one of a generally square shape like a plate of a short length placed in plural array. This backing arrangement is flexible as a whole, missible with a melted metal and good in back bead formation and therefore has been widely acceptable for land welding. However, this backing member when used in water becomes hygroscopic as it is porous, and a water content having pooled inside the backing member decomposes upon exposure to the heat arising from a welding arc, thereby generating a hydrogen gas in large quantities. This gas causes disturbed arc, ultimately making it impossible to conduct welding.

To overcome the problem with hygroscopicity discussed above, it is required that a dense backing member be produced with a composition of the backing member currently practiced in the art. To this end, calcination should be effected at an extremely high temperature with eventual need for use of expensive production equipment.

(4) A Backing Member for Land Welding:

When placed in humid condition or wetted with water, a ceramic backing member in common use for land welding absorbs water and generates a large amount of a hydrogen gas during welding as stated above in item (3), thus causing weld defects such as blowholes, cracks and the like. Therefore, the ceramic backing member is usually unsuitable for use in a highly humid or rainy environment. Even in in-plant welding, it needs to be dried in a drying oven prior to use. A burden of extra control cost is thus necessary for making the ceramic backing member free from being hygroscopic.

The ceramic backing member is not applicable in the case where joint is great at welding bevels. It is known that this joint mis-alignment height can be coped with by a backing method in which use is made of aparticulate flux employed in one-sided land welding, or by a backing method in which a strip of glass fiber is used. Because the particulate flux and glass fiber strip are of a hygroscopic nature, those known methods are unsuitable for use in a highly humid or underwater atmosphere. The backing members for welding use in such methods absorb moisture when placed in humid condition or wetted with water, ultimately generating a hydrogen gas in quantity during welding and involving weld defects such as blow holes, cracks and the like.

In order to prevent the particulate flux from becoming adversely hygroscopic, "a backing flux for one-sided welding and a method of producing the same" is disclosed in Japanese Patent Laid-Open No. 48-49. Namely, coal tar is added in an amount of 0.5–8% to flux components so as to achieve improved fixing between a melted metal and a particulate flux. Although this prior art method is effective in avoiding the flux from becoming hygroscopic while in storage, the flux is less repellent to water but rather hygroscopic on contact with water during rainfall or in watery condition. The flux cannot be used for welding unless it is dried.

The foregoing description is related to the problems with backing members. Further problems arise from welding bevels and welding rods in the case of welding in a highly humid, rainy or underwater environment. To be more specific, two members to be welded are generally processed at their bevels in advance in plants, whereas steel materials are not particularly treated in most cases. Thus, rust occurs at those bevels and needs to be removed in situ at the time of welding operation. Depending upon the kind of materials used, the bevels are often protected with a tape-like protector adhesively bonded thereover. This adds a process step of releasing the protector before welding operation.

Besides and particularly, as a result of the recent advent of large-scale structures fixed in water, large-scale structures installed to be floating in water and the like, a certain technique has enjoyed reputation which can effect welding of high quality even in the severest underwater environment. In order to ensure that high-quality welding be achieved in such a wet environment as in underwater welding, special facilities are required to be located to artificially define an ideal local environment surrounding a welding area.

This invites increased cost which creates an obstacle to practical application of the above stated technique.

Since two members to be welded gather rust due to moisture or humidity caused by condensation, meticulous attention has been paid to rust removal and rust prevention for example at their bevels. Furthermore, when these members become hygroscopic or absorbs moisture on contact with water, the resulting water content decomposes in the influence of the heat arising from a welding arc and hence generates a large amount of a hydrogen gas which in turn produces weld faults such as blow holes, fractures and the like.

It has been taken as absolutely necessary, in recent years, that a welding member should be maintained in proper or appropriate condition by removing foreign matter such as moisture or the like therefrom in such a manner that the resultant welded area can be rendered durable so as to obtain the finished product of improved quality. For example, a coated welding rod or a flux has been stored in a temperature- and humidity-constant chamber or in an inert gas atmosphere. The foreign matter present in the welding area has been removed by means of suitable physical and chemical methods combined together. As the hazard or damage of a breakage accident is greater which would be due to welding failure as in atomic power-related machinery and high-pressure gas machinery, the quality control is stricter with respect to welding operation.

For example, a coated welding rod for use in wet underwater welding is obtained in commerce which has been made proof to water on its outer surface by copper plating. In underwater repairing usually conducted, a commercially available welding rod for land welding has in many cases been used after being rendered watertight simply by winding a vinyl tape around an outer surface thereof. Additionally, Japanese Patent Laid-Open No. 1-233093 discloses a coated welding rod of a water-repellent type for use in atmospheric welding but not in underwater welding. This is a coated welding rod of a non- or low-hydrogen type obtained by coating a copper core wire use of a coating agent composed of silicone in an amount of 0.05–0.20% by weight and, as the balance, an arc stabilizer, a slug-forming agent, a deacidification agent, an organic matter and a fixing agent.

However, the copper-plated water-proof coated welding rod is costly, and once being subject to a flaw, the copper-plated film absorbs moisture thereat and loses a beneficial effect inherent to copper plating. In regard to the coated welding rod obtained commercially and wound with a vinyl tape, water tends to intrude into a gap between the tape and the rod, or the tape has a strong tendency to get damaged and moistened when the welding worker remains dived for an extended length of time and stores the welding rod in a storage kit, takes the rod out of the kit, or secures the rod to a welding holder. Lastly, the coated welding rod of a non- or low-hydrogen type containing a silicone-containing coating agent is a special one resulting from addition of silicone in the course of formation of the welding rod. In water, however, such welding rod is partially hygroscopic and totally inapplicable. The welding rod may be useful in a highly humid environment, but on contact with water such as rain or the like, it becomes moistened as it is insufficiently repellent to water and hence needs to be dried prior to use.

SUMMARY OF THE INVENTION

The present invention provides, as a first object, a welding member such as of a welding backing material, a welding bevel, a coated welding rod or the like which permits welding to be adequately conducted even in a watery working environment as under underwater or highly humid conditions or the like.

A second object of the invention is to provide a welding backing member which is flexible enough to follow joint mis-alignment at welding bevels and capable of attaining good back beads even in an underwater or highly humid working environment.

A third object of the invention is to provide a welding method which can protect a welding area against wetting with water or adherence of foreign matter in an underwater or highly humid environment, thereby producing a welded area with enhanced durability.

To achieve the above objects, the welding member of the present invention is so constructed as to have on its surface a water-repellent film or a water-repellent layer (hereinafter called a water-repellent film). When such welding member is submerged in water, the water-repellent film retains on its surface an air membrane. More specifically, the water-repellent film is provided on its surface with minute concavities and convexities, which film is disposed on the surfaces of components of the welding member.

Such water-repellent film is characteristic of the fact that upon immersion in water, it retains on its surface an air membrane. In consequence, even in the case where moisture tends to condense on the welding material in a highly humid atmosphere, or where rain or water tends to contact with the surface of the welding member, an air membrane is formed between water droplets or the like and the welding member surface so that the water droplets or the like do not adhere to the surface of the latter welding member, and the welding member does not almost wet. The air membrane formed on the surface of the water-repellent film when, immersed in water, can be easily inspected since it reflects to be silver upon light exposure. For these advantages, the present invention can be practiced for example as a welding backing member disposed backside the joint of welding bevels, as welding bevels of the welding base member, or as a coated welding rod in which a metallic core wire is coated with a flux so that welding is made satisfactorily feasible even in an underwater or highly humid working environment.

As for the backing member, a water-repellent film can be formed on the surface of a substrate derived by fixing a particulate ceramic or a particulate flux as an inorganic material and then treated to be of a hydrophobic nature. Alternatively, a water-repellent film may be disposed on the surface of a coated layer, which film is made hydrophobic at least on its surface and composed of aqueous particles capable of forming minute concavities and convexities and a binder. In this instance, water or water droplets brought into contact with the substrate surface do not intrude into those pores defined in the substrate but gets remained on that surface. In particular, since the particulate ceramic stated above has been treated to be hydrophobic also at its inside portion, water does not enter the inside of the ceramic even submerged in water with the result that the ceramic is protected from becoming fully wet with water. Accordingly, the bevels backed by the above backing member is welded by use of an underwater welding nozzle of a water screen type. Water is allowed to completely escape, by means of a shield gas, from a localized cavity defined directly beneath the welding nozzle so that welding is possible in water-free manner, whereby stable welding and good uranami beads are attainable. The water screen-type underwater welding nozzle stated here is such having a double-nozzled structure in which water is jetted out of an outer nozzle to thereby provide a screen-like barrier, and a localized cavity is defined directly beneath the welding nozzle.

Also alternatively, the backing member may be formed of a particulate flux and a hollow flexible package filled with such flux. This form of backing member, though not repellent to water, may be in pressed attachment to the bevels on its backsides and is easy to vary its shape in response to joint mis-alignment of the bevels or to deformation of the latter which is liable to take place during welding. With the flexible backing member employed, a weld bead can be provided with a smooth back shape.

In the case of use of the above flexible backing in underwater or rainy conditions, it is desired that a water-repellent film as specified hereinbefore be disposed on the surface of the flexible package or the surfaces of both the particulate flux and the flexible package. Upon immersion in water, this water-repellent film forms on its surface an air membrane, eventually repelling water having contacted with the surface of the backing member and precluding intrusion of the water in the latter member. Further and preferably, the particulate flux contained in the flexible package has a water-repellent film disposed thereon as is in the above package.

Even if the flexible package breaks in part by accident and hence allows for entry of water, a filler of the particulate flux having a coated layer repels the water for its water repellency and avoids the water against penetration in that filler.

To dispose such flexible backing member backside two members to be welded, an adhesive tape may preferably be applied to the flexible package on its surface portions which are brought into contact with the backside portions of the members to be welded. In place of the adhesive tape, magnets may also preferably be attached. As a further alternative, the flexible backing member may be supported by a supporting member located in straddled relation to both of the members to be welded such that the backing member is abutted against the backside of the bevels. In such instance, an adhesive tape may desirably be applied to the supporting member at its portions which are contacted with the backside portions of the members to be welded.

Desirably, the flexible package maybe formed of a glass fiber.

As regards the coated welding rod, a water-repellent film is disposed over the surface of a coated layer composed of a flux and the like by surface treatment with use of a hydrophobic group-containing material. An alternative water-repellent film may be disposed on the surface of the coated layer, which alternative film is composed of hydrophobic particles treated to be hydrophobic at least at their respective surfaces and a binder.

Further, in a variety of wet underwater welding methods, at least one of a welding backing member and a welding bevel of a welding base member is coated on its surface with a slurry-like hydrophobic-treating agent derived from a mixture of a hydrophobic powder made hydrophobic at least at its surface, a binder and a solvent. In this way, welding is effected so that water and foreign matter can be prevented from becoming undesirably adherent in an underwater or highly humid environment with ultimate improvement in durability of the finished welded area.

The water-repellent film according to the present invention is now described with particular regard to its preparation methods and its operation aspects.

Such water-repellent film forms and retains an air membrane upon submergence in water. It has now been found that two requirements set forth below should importantly be observed to retain the air membrane.

(1) Materials on their surfaces should be hydrophobic.
(2) Materials should have minute concavities and convexities on their surfaces.

The former hydrophobic nature is preferably more than 90 degrees in terms of a contact angle relative to water. The latter minute concavities and convexities formed on the surface of a welding member cooperate with the former hydrophobic nature in defining a space required for retaining an air membrane on the welding member surface in water. Namely, these concavities and convexities act to entrap air therein in the water when the water-repellent film is submerged in the water, thus retaining the air membrane on the welding member surface and avoiding the water from direct contact with the welding member.

In such case, the minute concavities and convexities disposed on the welding member surface may be triangular, hemispherical or indefinitely shaped protuberances and indentations as viewed cross-sectionally and placed in continuous or irregular arrangement. The concavity and convexity are sized to be preferably 2 nm–200 $\mu$m as determined in terms of a concavity-to-concavity spacing and a convexity-to-convexity spacing (hereinafter referred to simply as a concavity-to-convexity spacing). A concavity-to-convexity spacing of 20 nm–50 $\mu$m is more preferable. Less than 20 nm leads to too small a space for air retention, resulting in reduced volume of an air membrane in water. More than 200 $\mu$m invites a large concavity-to-convexity spacing and hence poor air retention in water.

The concavity and convexity has a height preferably of 20 nm or above. Lower than this numerical value involves deteriorated retention of an air membrane. For formation of the air membrane, the upper limit of the height is not particularly restrictive, but is in such a range that should not be conducive to inconvenient welding operation and inadequate dimensional accuracy. 1 mm or below is preferred.

Next, the water-repellent film with those minute concavities and convexities specified above is described with respect to specific examples of its formation methods. In a first suitable method, a slurry-like hydrophobic-treating agent is prepared which is derived by mixing and dispersing an inorganic hydrophobic particulate oxide and/or a particulate polytetrafluoroethylene as an organic hydrophobic material, a resin and a solvent, and this hydrophobic-treating agent is coated over the surface of a welding member. Where use is made, as a welding member, of a backing member having a substrate formed by fixing a flux and a ceramic, or of a flexible backing member having a substrate formed of a glass fiber or a substrate formed of a glass fiber substrate mixed with a particulate flux, each such backing member is originally provided on its surface with minute concavities and convexities. In addition to coating of the above-specified hydrophobic-treating agent, therefore, each backing member may be subjected to a second suitable method in which a water-repellent film is directly formed on the substrate by bonding a hydrophobic group to the substrate surface of the latter through surface treatment with a liquid agent of a so-called hydrophobic group-containing alkoxysilane, chlorosilane or silazane, dimethylpolysiloxane, a hydrophobic group-containing titanate coupling agent or an aluminum-type coupling agent.

Inorganic hydrophobic particulate oxides for use in the above coating are chosen from at least one of powders such as of silica, alumina, titanium oxide, iron oxide and the like, which powders have been treated with a hydrophobic group-containing surface treatment. The particle size of the inorganic particulate oxide is preferably 0.001–100 μm. Not more than 0.001 μm in particle size makes the particulate oxide inconvenient to handle in preparing a hydrophobic-treating agent. Above 100 μm is ineffective to sufficiently impregnate the particulate oxide into the pores present in a substrate obtained as a molded product from a particulate ceramic. Chemical agents used in making the inorganic particulate oxide hydrophobic are selected from among those stated above in connection with the hydrophobic treatment of the substrate, i.e., so-called silane compounds such as alkyl group-containing silane, fluorine-substituted hydrophobic group-containing silane, chlorosilane and silazane, dimethylpolysiloxane, alkyl group-containing titanate coupling agents and aluminum-type coupling agents. Without limitation to the aforementioned method, other selected methods may be eligible so long as they are capable of treating the inorganic particulate oxide as being hydrophobic.

Among alkyl group-containing silane compounds, methyl group-containing silane compounds include for example methylmethoxysilane $CH_3Si(OCH_3)_3$, dimethyldimethoxysilane $(CH_3)_2Si(OCH_3)_2$, trimethylmethoxysilane $(CH_3)_3Si(OCH_3)$, methyltriethoxysilane $CH_3Si(OC_2H_5)_3$, dimethydiethoxysilane $(CH_3)_2Si(OC_2H_5)_2$, trimethylethoxysilane $(CH_3)_3Si(OC_2H_5)$, hexamethyldisilazane and the like.

Ethyl group-containing silane compounds include ethyltrimethoxysilane $C_2H_5Si(OCH_3)_3$, diethydimethoxysilane $(C_2H_5)_2Si(OCH_3)_2$, triethylmethoxysilane $(C_2H_5)_3Si(OCH_3)$, ethyltriethoxysilane $C_2H_5Si(OC_2H_5)_3$, diethyldiethoxysilane $(C_2H)_5Si(OC_2H_5)_2$, triethylethoxysilane $(C_2H_5)_3Si(OC_2H_5)$ and the like.

Propyl group-containing silane compounds include propyltrimethoxysilane $C_3H_7Si(OCH_3)_3$, dipropyldimethoxysilane $(C_3H_7)_2Si(OCH_3)_2$, tripropylmethoxysilane $(C_2H_7)_3Si(OCH_3)$, propyltriethoxysilane $C_3H_7Si(OC_2H_5)_3$, dipropyldiethoxysilane $(C_3H_7)_2Si(OC_2H_5)_2$, tripropylethoxysilane $(C_3H_7)_3Si(OC_2H_5)$ and the like.

Long-chain alkylsilanes include n-octadecyltrimethoxysilane, n-dodecyltriethoxysilane and the like.

To an alkoxysilane noted above and containing 1–3 alkyl groups of 1–20 carbon atoms may be added chlorosilane or silazane either singly or in combination. The metal alkoxides according to the present invention should not be considered limited to those listed compounds (similar reasoning being applicable as such to those compounds described later).

Fluorine-substituted hydrophobic group-containing silane compounds are chosen from for example alkoxysilanes containing a perfluoroalkyl group of a carbon number of 1–20, preferably of 1–10, such as perfluorooctylethylethoxysilane $CF_3(CF_2)_7(CH_2)_2Si(OC_2H_5)_3$, perfluoroisopropyl-ethyltriethoxysilane $(CF_3)_2CF(CH_2)_2Si(OC_2H_5)_3$, perfluoromethyl-ethyltrimethoxysilane, perfluorobutylethyltrimethoxysilane, perfluorooctylethyltrimethoxysilane, perfluorooctylethylmethyldimethoxysilane and the like.

Titanate coupling agents are chosen from isopropyltriisostearoyl titanate, isopropyyl tris(dioctylpyrophosphate)-titanate, tetraisopropylbis(dioctyl phosphite)titanate, tetraoctyl bis(ditridecyl phosphite)titanate and the like.

Aluminum-type coupling agents are typified by acetalkoxyaluminum diisopropriate.

As hydrophobic powders, particulate tetrafluoro-ethylene is also desirable. The inorganic hydrophobic particulate oxide mentioned above and the particulate tetrafluoroethylene may be used alone or in combination.

In order to coat a welding material with a slurry-like hydrophobic-treating agent derived by mixing a hydrophobic powder, a resin and a solvent to each other, conventional methods may be utilized which include spraying, brushing, dipping and the like. The mixing ratio of hydrophobic powder to resin is 100:0–10:90 on a weight basis. This ratio is preferable but not restrictive. Acceptably, a contact angle of 90° or above is attainable between water and the surface of a hydrophobic-treated welding material.

The water-repellent film formed by use of each of the foregoing surface treatments can retain an air membrane when the former is submerged in water. Here, this unique property is explained with reference to FIG. 5, FIG. 6 and FIG. 7 of the accompanying drawings. As shown in FIG. 5, a flat plate 20 (made of metal, ceramic or plastic) with a water-repellent film 21 disposed on its partial surface portion is allowed to put into water 23 out of the atmosphere with the result that air contacted with the surface of the film 21 is brought as such into the water, and an air membrane 22 is formed on the film surface. When a limited amount of air is fed to the membrane 22 through a capillary 24, the air is entrapped in the membrane 22 which in turn is dilated as viewed by dotted lines in FIG. 5. Thus, the water-repellent film 21 on its surface retains the thin air membrane 22 in the water and entraps extraneous air in the membrane 22.

This property of air entrapment is then explained with reference to FIGS. 6(A) and (B). As seen in FIG. 6(A), a flat plate 20 with a water-repellent film 21 disposed on its entire surface is caused to tilt in water. When air is continuously supplied on to the surface of the plate 20 through a capillary 24, the air gets entrapped in an air membrane 22 retained on the surface of the film 21 and flows upwardly along a tilted slope of the plate 20, ultimately floating up as bubbles 27 from one end of the membrane 22. FIG. 6(B) is a view showing the flat plate 20 of FIG. 6(A) generally elevationally. As viewed in FIG. 6(B), air 25 flows along an upward slope of the plate 20 in diverged condition and ends with an air pool 26 at an uppermost end of the plate 20, finally floating up as bubbles 27 from the pool 26. In contrast, a flat plate 20 with a water-repellent film omitted, or for example with its background metal exposed from view is immersed in water in slightly tilted posture, and air is then flowed on to the surface of the metal plate through a capillary. Reference to FIG. 7 shows that immediately after contact with the metal surface, the air departs therefrom and floats up as bubbles.

BRIEF DESCRIPTION OF THE DRAWINGS

FIGS. 17A through 17F are views showing several beveling at a welding area in which the invention can be practiced.

DESCRIPTION OF THE PREFERRED EMBODIMENTS

Figure 1:
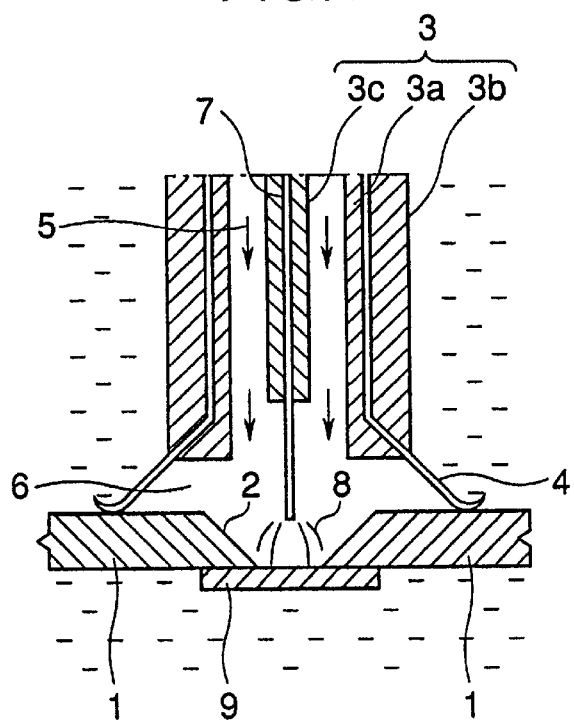
FIG. 1 is a view explanatory of the principle as to a wet underwater welding method of a water screen type.

Firstly, an underwater welding method in which use is made of the backing member for underwater welding according to the present invention, i.e., a wet underwater welding method of a water screen type, is explained with reference to FIG. 1. The water screen-type wet underwater welding method is conducted by use of a gas metal arc welding method. In principle, a welding nozzle 3 is disposed upwardly of two welding bevels 2 located between two mating members 1, 1 to be welded. The welding nozzle 3 is movable longitudinally of the bevels 2 and is doubly cylindrical in structure. A water screen 4 of a trumpet-like shape is provided by spraying water on to both the members 1 to be welded and the welding bevels 2 out of and through a gap between outer and inner cylinders 3a, 3b. With a shield gas 5 being flowed from the inner cylinder 3a, a cavity 6 is defined in the water screen 4. The provision of this cavity protects, against ambient water, an arc 8 generated between the members to be welded and a welding wire 7 supplied through a contact chip 3c positioned in axial alignment to the inner cylinder 3a, and also a melt pond provided in the bevels 2 by means of the arc 8. A backing member 9 is usually attached to the bevels 2 to be butted as seen in FIG. 1. In this welding method, the members to be welded even when wetted on their outer surfaces with water are rendered free from the water by means of the water screen and the shield gas, whereby a localized cavity filled with the shield gas is provided. Consequently, a welding area is held in dry condition so that welding can be stably conducted. In the case of use of the backing member for land welding, a gas metal arc welding method may be utilized which is commonly known.

The welding member according to the present invention is now described in more detail as applied to a welding backing member.

Embodiment 1

Explanation is provided as to a first embodiment of the invention in which the welding member is used as a backing member for underwater welding and as to a backing member made free from being hygroscopic for land welding. The backing member of this embodiment was prepared with use of the following starting substrate, hydrophobic-treating agent and coating method.

starting substrate: welding backing member FBB-3T for land welding dimensioned to be 32 mm long×28 mm wide×9 mm thick and having generally arched grooves provided on its surface (product of Kobe Steel Corporation).

hydrophobic-treating agent: slurry derived by mixing 50 parts by weight of a silica powder as a hydrophobic powder ($SiO_2$ 99%, particle size 2 μm) that was hydrophobic-treated on its surface with trimethylmethoxysilane, 50 parts by weight of a resin (silicone resin curable at room temperature, solid content 20%) and 200 parts by weight of isopropyl alcohol as a solvent.

coating method: The substrate was immersed for about about 1 minute in the hydrophobic-treating agent and then dried at room temperature. An inked line drawn centrally on the surface of the FBB-3T substrate (marked line for attachment of the substrate to a member to be welded) was erased in advance with use of an acetone solution and then subjected to drying.

The contact angle of the surface of the backing member according to the invention in this embodiment was 160 degrees with respect to water. On immersion in water, this backing member provided on its surface an air membrane.

Figure 2:
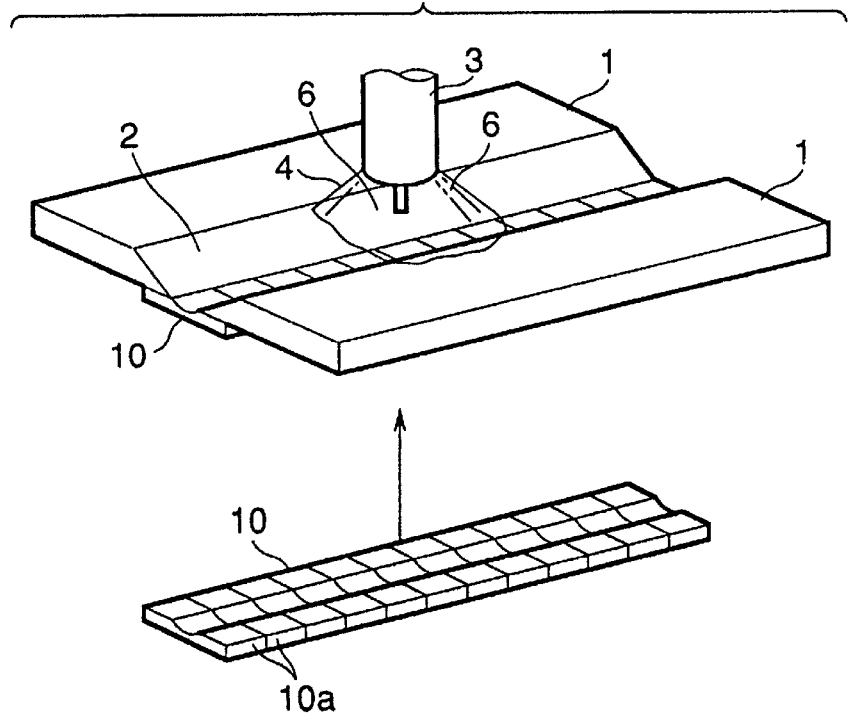
FIG. 2 is a view showing a wet underwater welding method of a water screen type in which a welding backing member provided in accordance with the present invention has been practiced.

Underwater welding was thereafter conducted, as shown in FIG. 2, by use of the water-repellent backing member 10 prepared in this embodiment. An underwater welding method employed here is basically of the same as the water screen-type underwater welding method described above in connection with FIG. 1, and hence like component parts are indicated by like reference numerals in FIGS. 1 and 2. However, as the backing member 10, a plurality of small backing members 10a each dimensioned to be 32 mm long×28 mm wide×9 mm thick were used in longitudinal juxtaposition. Details of the welding operation are as follows:

underwater welding: in water bath of 30 cm in depth.
welding machine: $CO_2$ arc automatic welder.
shield gas: $CO_2$, flow rate 120–140 l/min.
welding wire: 1.2 o, solid wire (MG-50, product of Kobe Steel Corporation).
welding conditions: welding current 200–300 A, arc voltage 28–32 V, welding speed 12–15 cm/min
test members to be welded: 2 mild steel plates of 13 mm in thickness, bevel angle 45°, V-type beveling, root gap 5–10 mm, joint mis-alignment height 0–2 mm.
attachment of backing member: The backing member was securely attached, by pressing with an iron plate, to the backsides of the test members to be welded with a flexible rubber interposed therebetween.

Figure 3:
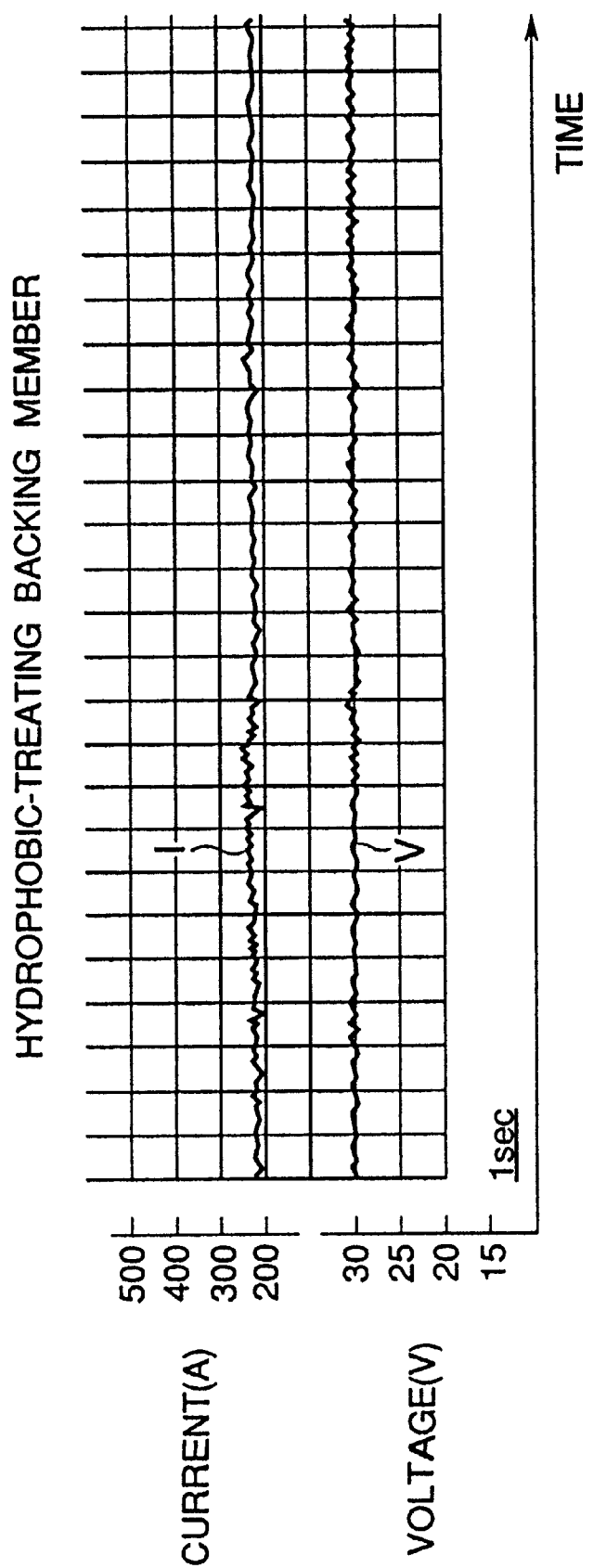
FIG. 3 is a view showing the welding current wavy and the arc voltage wavy as measured in an underwater welding in which the welding backing member of the invention has been practiced.

With use of the backing member of this embodiment, underwater welding based on $CO_2$ arc automatic welding was carried out under the above conditions. The resulting weld bead was good in appearance on its front and back sides, and moreover, the junction portion between the back bead and the base members was smooth. X-Ray non-destructive inspection revealed no internal defects nor adverse effects arising from hydrophobic treatment. The wavy of each of the welding current I and the arc voltage V as measured in the underwater welding is represented in FIG. 3. Each such wavy is comparable favorably to that in land welding, and this means that stable welding is achievable.

Next, the above procedure was repeated except that a MAG pulse arc welding machine was used in place of the $CO_2$ arc welding machine, a flux wire (DW-100, product of Kobe Steel Corporation) was used as a welding wire, and a mixture of 80% and Ar and 20% $CO_2$ was used as a shield gas. The results obtained with the MAG pulse arc welding are good and equivalent to those with the $CO_2$ arc welding.

Figure 4:
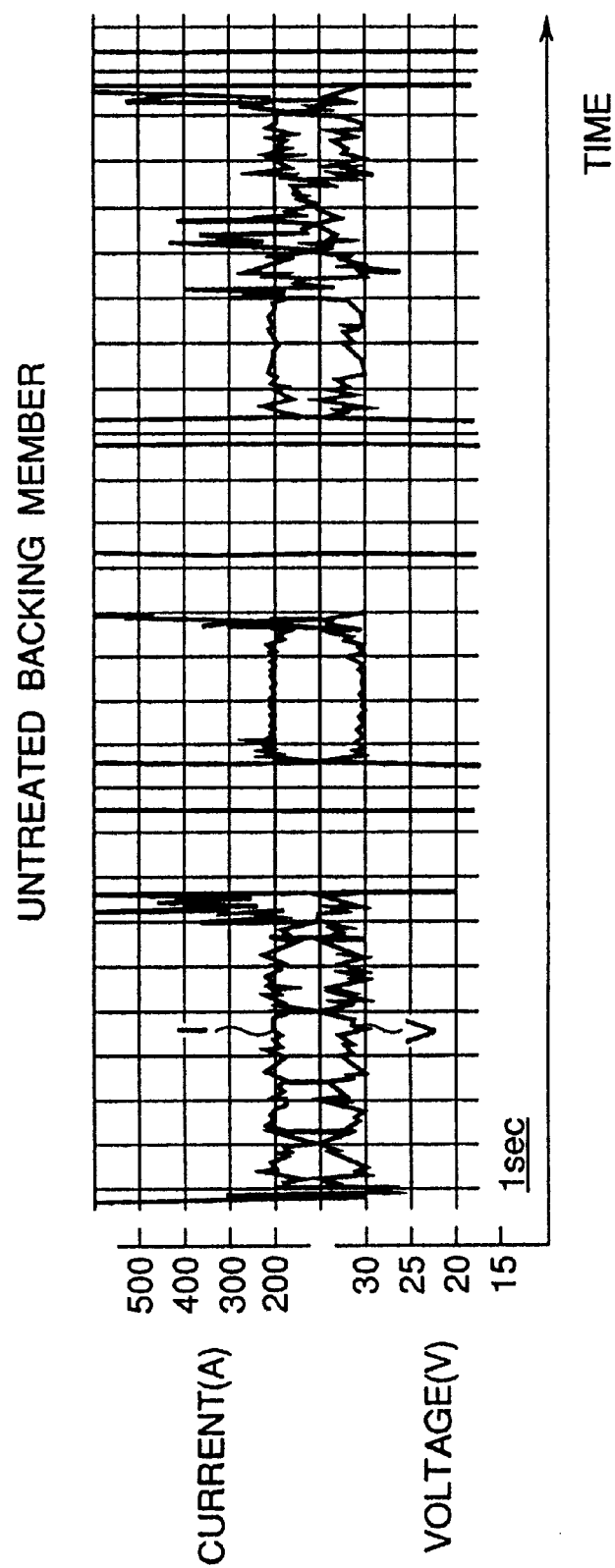
FIG. 4 is a view showing the welding current wavy and the arc voltage wavy as measured in an underwater welding in which a welding backing member for land welding has been used for comparative purposes.
Figure 5:
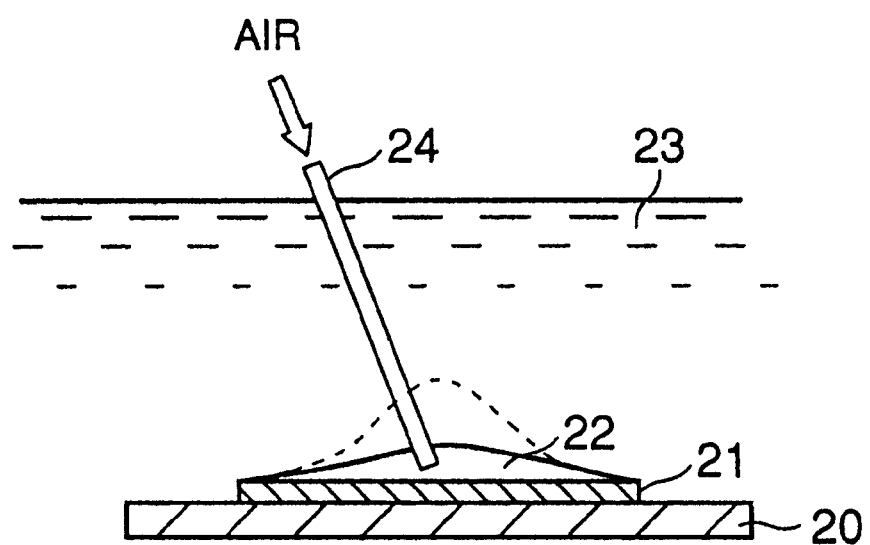
FIG. 5 is a view explanatory of the operation of a water-repellent film retaining on its surface an air membrane in water.
Figure 6A:
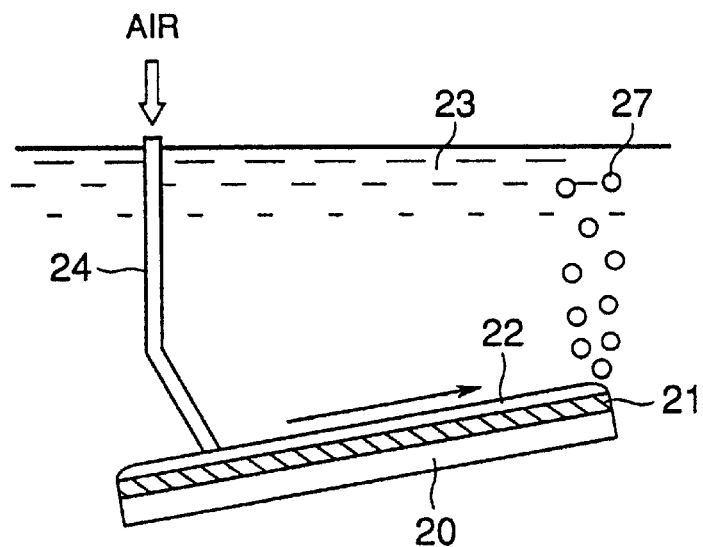
FIGS. 6A and 6B are views explanatory of a water-repellent film formed on the surface of a plate and retaining an air membrane, and air entrapped in the air membrane being flowable along the surface of the water-repellent film.
Figure 6B:
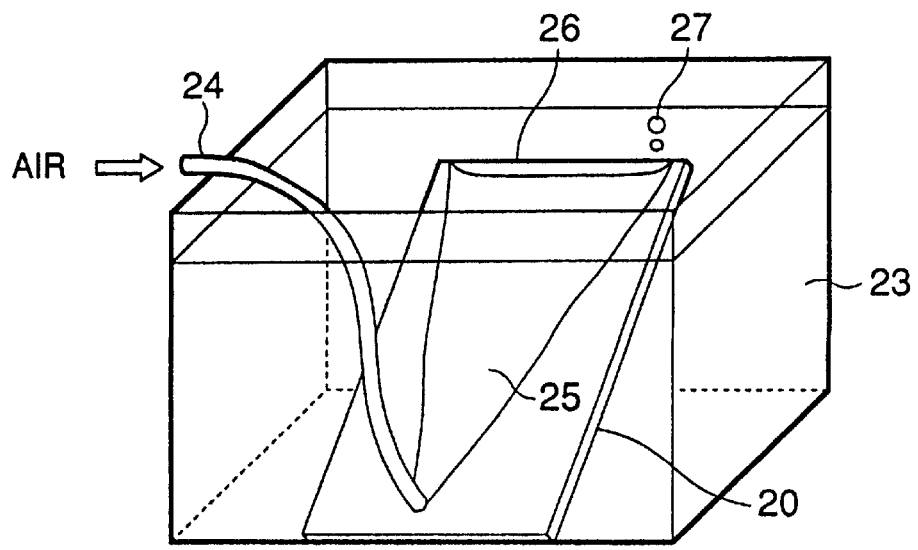
Figure 7:
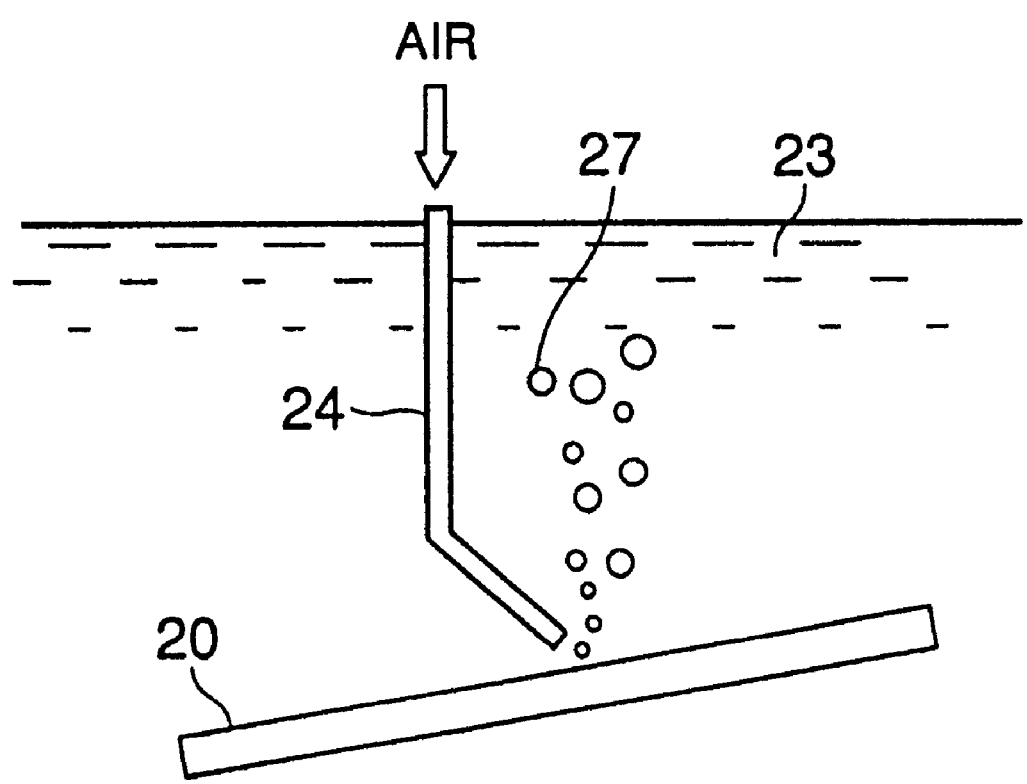
FIG. 7 is a view showing the manner in which when air is supplied on to the surface of a plate made devoid of repellency treatment and immersed in water, the air gets immediately floated up as bubbles.

To facilitate comparison, FIG. 4 represents the wavy of each of the welding current I and the arc voltage V as measured in an underwater welding in which a FBB-3T backing member for land welding was employed. As is clear from FIG. 4, both the welding current I and the arc voltage V are markedly instable, and the welding arc is discontinuous. The resulting weld bead, in fact, has been found exceptionally rough. This is because the backing member got moistened, and a water content having pooled therein invited disturbed welding arc.

Embodiment 2

Explanation is provided as to a second embodiment of the backing member for underwater welding according to the present invention and as to a non-hygroscopic backing member for land welding.

starting substrate: molded product resulting from a particulate ceramic composed of 80% of $SiO_2$ and 20% of $Al_2O_3$, each such percentage being by by weight, and dimensioned to be 32 mm long×28 mm wide×9 mm thick.
hydrophobic treatment and its method: The substrate as a sintered ceramic product was immersed for 1 minute in a mixed solution of 20 parts of n-octadecyltrimethoxysilane and 80 parts of n-hexane, each such part being by weight, and then maintained for 24 hours in a drying apparatus of 50° C., thereby curing the hydrophobic-treating agent and completing hydrophobic treatment. The contact angle of the surface of the backing member thus hydrophobic-treated was 140 degrees relative to water.

With use of the backing member prepared above and under the same welding procedure as in Embodiment 1, underwater welding was effected according to each of a $CO_2$ arc welding method and a MAG pulse arc welding method. In both welding methods, the resultant welding arc was stable, and the resultant weld bead was good in appearance on its front and back sides. No internal faults were found by X-ray non-destructive inspection.

Embodiment 3

Explanation is provided as to a third embodiment of the backing member for underwater welding according to the present invention and as to a non-hygroscopic backing member for land welding.

starting substrate: same ceramic backing member FBB-3T as used in Embodiment 1 and dimensioned to be 32 mm long×28 mm wide×9 mm thick.
hydrophobic-treating agent: slurry derived by mixing 60 parts of a finely powdered tetrafluoroethylene (particle size 5 $\mu$m) as ahydrophobic powder, 40 parts of bisphenol A-type epoxy resin (product of Three Bond Co.) as a resin and 200 parts of toluene as a solvent, each such part being by weight.
coating method: The substrate was immersed for about 1 minute in the hydrophobic-treating agent, followed by drying.

An inked line drawn centrally on the surface of the FBB-3T substrate (marked line for attachment of the substrate to a member to be welded) was erased in advance with use of an acetone solution and subsequently dried.

The contact angle of the surface of the backing member according to the invention in this embodiment was 160 degrees with respect to water.

With use of the backing member prepared above and under the same welding procedure as used in Embodiment 1, underwater welding was effected according to each of a $CO_2$ arc welding method and a MAG pulse arc welding method. In both welding methods, the resultant welding arc was stable, and the resultant weld bead was good in appearance on its front and back sides.

No internal faults were found by X-ray non-destructive inspection.

It was assumed, for further testing, that a backing member had become wet due to rainfall during outdoor welding operation.

After attachment of the backing member according to the invention, the resultant bevel was allowed to wet with water, followed by removal of the water through blown compressed air and by subsequent welding based on a usual $CO_2$ welding method in the atmosphere. As a result, the water on such backing member was completely removed only by blowing of compressed air so that stable welding could be attained. X-Ray inspection showed that no internal failures were present, indicating that satisfactory welding was possible.

Accordingly, the backing member of the invention is not hygroscopic and hence suitable for underwater welding as well as land welding.

Also in the case of land welding, a hygroscopic backing member invites weld faults such as blow holes, fractures flowing from hydrogen and the like, thus requiring severe control. This type of backing member is generally controlled in a drying oven.

Particularly as for welding of expensive materials such as a high-tension steel and the like, stricter control is required with respect to the associated backing member. In contrast, the water-repellent backing member according to the invention brings about simplified control and possible use for welding especially in a highly hygroscopic environment (for example, in a ballast tank of a ship, in ocean welding operation and the like).

The above backing member for underwater welding according to the present invention is so constructed that after hydrophobic treatment, it has a water repellency corresponding to a contact angle of not less than 90 degrees with respect to water. Thus, this backing member does not get moistened even in water, leading to a good bead in underwater welding on a wet underwater welding method. In land welding, the backing member produces a durable welded area even under highly humid or rainy conditions.

Also advantageously, the backing member for underwater welding according to the invention is obtainable simply by coating a commercially available backing member for land welding with a slurry derived from mixing and dispersing a hydrophobic powder, a resin and a solvent, or by treating such land welding-purpose backing member with a hydrophobic group-containing surface-treating agent, thereby bonding a hydrophobic group to the surface of the former backing member.

Embodiment 4

Figure 8:
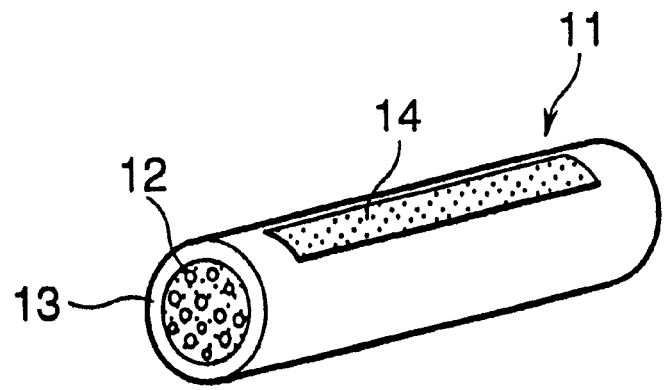
FIG. 8 is a view showing the construction of a flexible welding backing member according to the invention.
Figure 9:
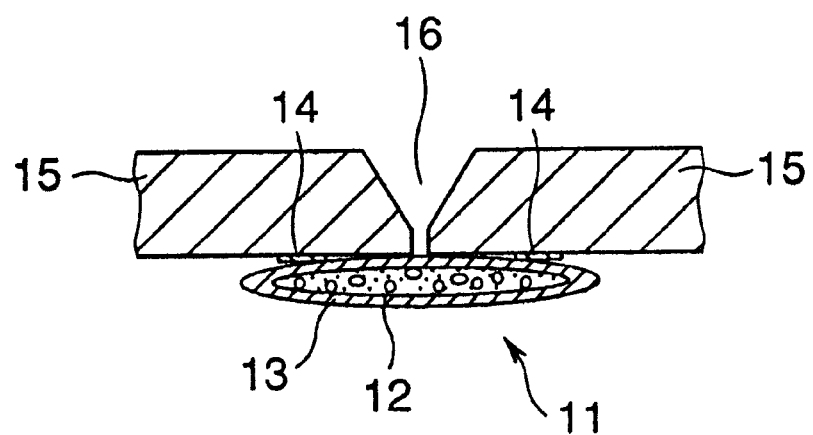
FIG. 9 is a cross-sectional view showing the flexible backing member attached to two mating members to be welded.

FIG. 8 is a partial cross-sectional view showing the construction of a flexible backing member as a welding member according to the present invention. FIG. 9 is a cross-sectional view showing such flexible backing member as attached to two mating members to be welded. As viewed in FIG. 8, the flexible backing member 11 is comprised of a hydrophobic-treated powdered flux 12, a flexible package 13 made of a hydrophobic-treated glass fiber and filled with the flux 12, and two double-coated tapes 14 disposed lengthwise of the surface of the flexible package 13. On the surface of each of the powdered flux 12 and the flexible package 13, both of which have been subjected to hydrophobic treatment, a water-repellent film is formed which, when submerged in water, can retain an air membrane. The flexible package 13 made of a glass fiber is a bag-like structure having its both ends closed. As better seen in FIG. 9, the flexible backing member 11 is attached, in abutted relation and with the double-coated tapes 14, 14, to the backside of a butted bevel defined at a portion where two members 15, 15 to be welded to each other. For its flexibility, the flexible backing member 11 is useful for a bevel even with a curved backside. The length of one backing member and the interval of tape adhesion may be decided, depending upon the size and shape of structures to be welded. The flexible back member 11 may be constructed to have a hydrophobic-treated glass fiber-made flexible package filled with a usual particulate flux made devoid of hydrophobic treatment. However, care must be taken not to break such flexible package during welding operation.

By use of the above flexible backing members, the water screen-type wet underwater welding method described in relation to FIG. 1 can be conducted. In this case, since such a flexible backing member forms on its surface an thin air membrane in water, a shield gas is entrapped in the air membrane so that a water content is completely removed at from a portion adjacent to the surface of the flexible backing member 11.

Figure 10:
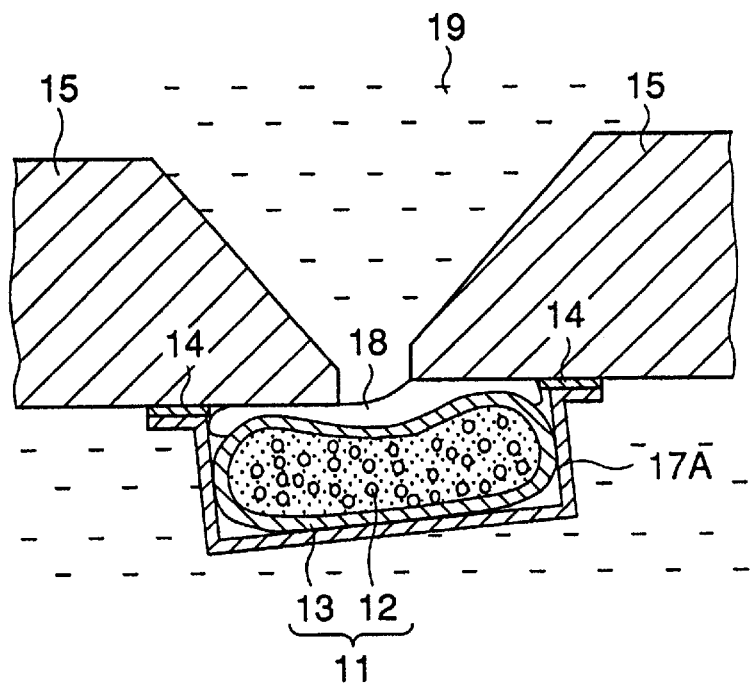
FIG. 10 is a view showing the flexible backing member disposed backside two mating welding bevels for underwater welding, and a fixing jig for attachment of the backing member.

In FIG. 10, a fixing jig is illustrated which is used in attaching the flexible backing member 11 to the backside of the welding bevel. The fixing jig 17A has a bracket defining a chamber for accommodating therein the flexible backing member 11, two flanges extending outwardly from two upper distal ends of the bracket, and double-coated tapes 14 placed on the upper surfaces of the flanges. The fixing jig 17A is attached, by means of the double-coated tapes 14, to the members 15 to be welded with the flexible backing member 11 received in the chamber and with the front surface of the flexible backing member 11 pressed against the backside of the bevelled portion.

The flexible backing member 11 easily follows a bevel of insufficient precision with joint variance or the like, consequently rendering the resultant weld bead smooth in its back shape over a range from the materials to be welded to the resultant melted metal. Further, because the flexible backing member 11 is obtained by wrapping the hydrophobic-treated powdered flux 12 with the hydrophobic-treated glass fiber-made package, a gas layer 18 can be provided by flowing a shield gas out of the upper surface of the bevelled portion even when a slight gap is defined between the flexible backing member 11 and the members 15 to be welded. The reason for this is that when the flexible backing member 11 is put from the atmosphere into water, the glass fiber-made flexible package 13 is brought into the water with a gas layer formed on the surface of the package, and high shielding is gained to thereby provide the gas layer 18 more easily.

Figure 11:
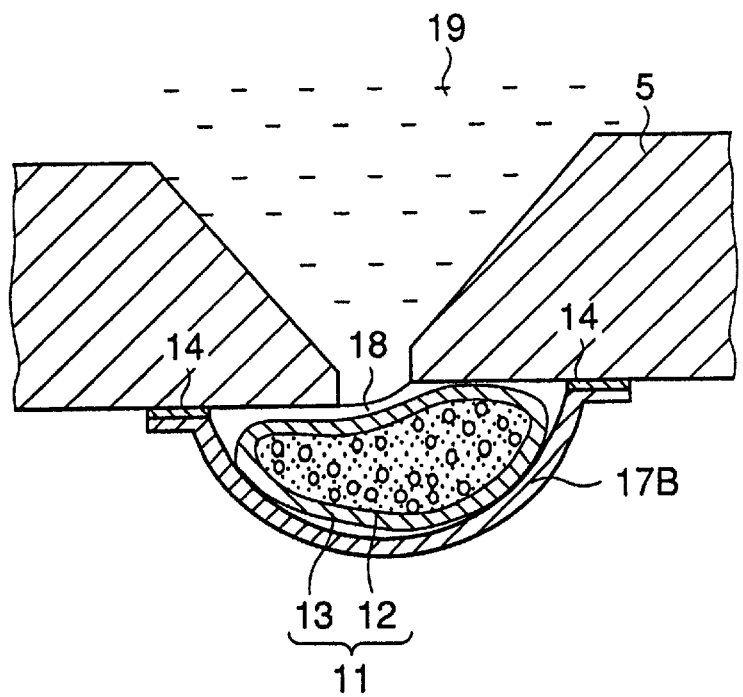
FIG. 11 is a view showing the flexible backing member disposed backside two mating welding bevels for underwater welding, and another fixing jig for attachment of the backing member.

Unlike the angular fixing jig 17A of FIG. 10, a fixing jig 17B illustrated in FIG. 11 is shaped to be from hemispherical to shallow dish-like as seen cross-sectionally. As the fixing jig 17B, a flexible bellows made of rubber or stainless steel may be used. The flexible backing member 11 may be secured in the fixing jig 17B by means of an adhesive with the result that easy handling is ensured, and the flexible backing member 11 is attached to the bevelled portion with improved working.

The flexible package for wrapping the particulate flux therein may be of a cotton fabric used commonly but treated to be hydrophobic, without limitation to the above-specified hydrophobic-treated glass fiber. A silicone rubber may be another suitable choice. A carbon fiber or a carbon fiber treated to be somewhat flexible and then fixed may also be used.

In order to attach the flexible backing member to the members to be welded, magnets may be employed as regards steel structures though the double-coated tape 14 can be applied to all kinds of materials of those members to be welded. The magnets are effective in enhancing attachment of the backing member in a watery or rainy environment.

Welding methods eligible for the backing member of the invention may be a coated arc welding, in addition to the gas metal arc welding. Such backing member is not hygroscopic and hence useful for underwater welding as well as land welding.

Also in the case of land welding, a hygroscopic backing member causes weld faults such blow holes, hydrogen-induced fractures and the like, thus requiring severe control. This type of backing member is generally controlled in a drying oven. Particularly as for welding of costly materials such as a high-tension steel and the like, stricter control is required with respect to the associated backing member. Hence, the backing member according to the invention produces simplified control and possible use for welding especially in a highly hygroscopic environment (for example, in a ballast tank of a ship, in ocean welding operation and the like). When water droplets remain on the backing member of the invention owing to rainfall during outdoor welding operation, they can be removed only by blowing compressed air to the surface of such backing member for subsequent possible welding.

As described hereinabove, the backing member according to the present invention is flexible enough to follow joint variance at a bevelled portion. This backing member is further treated to be hydrophobic so as to have a water-repellent film which, when immersed in water, can retain an air membrane. Due to the presence of such air membrane, the backing member does not become moistened even in water, eventually bringing about a good bead in underwater welding on a water screen-type wet underwater welding method and leading to a durably welded area in land welding even in a highly humid or rainy environment.

Embodiment 5

With reference to the drawings, explanation is now provided as to an underwater welding method in which the present invention has been practiced.

Figure 12:
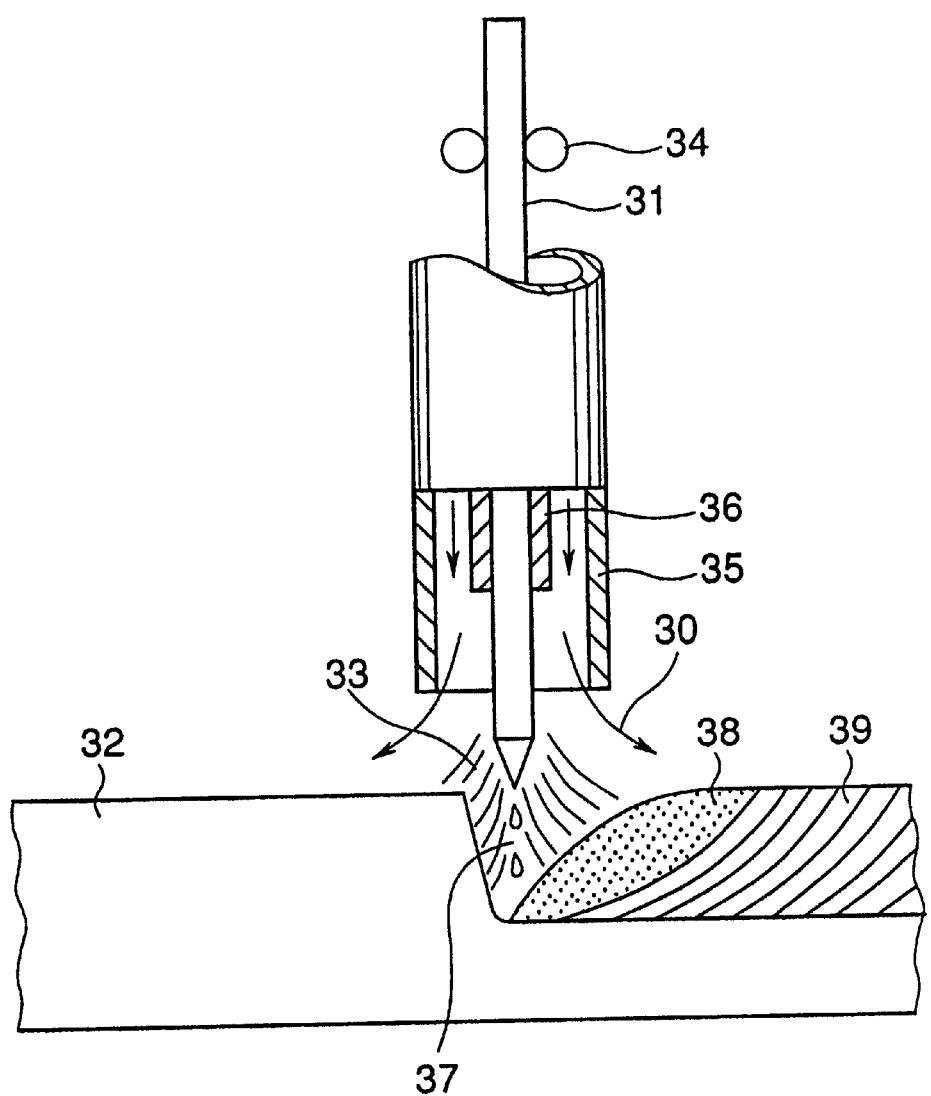
FIG. 12 is a basic view showing an arc welding method of a gas shield-expendable electrode type arc welding in which the invention has been practiced.

In FIG. 12, a basic drawing of a gas shield arc welding method is given which can be effected in the atmosphere and in water and to which the invention can be applied. The gas shield arc welding method has been taken shown here because it enables welding in both atmospheric and underwater environments. Gas shield arc welding includes an inert gas arc welding method which is conducted in a gaseous atmosphere of an inert gas such as argon, helium or the like, or a mixture thereof with a small amount of an active gas (carbon dioxide, oxygen or the like), and a carbon dioxide gas arc welding method which is conducted in a gaseous atmosphere predominantly of carbon dioxide. Also included are an expendable electrode type in which an electrode is melted into a melted metal during welding and an undependable electrode type (tungsten electrode type) which is opposite in principle to the former type. Both of the types are eligible for the invention.

Firstly, the basic concepts of gas shield welding are described with reference to FIG. 12. In a shield gas 30 such as argon, carbon dioxide or the like, an arc 33 is caused to generate between an electrode wire 31 and two base members 32. As the electrode wire 31 is melted, the resulting melt is supplied to conduct welding. As the shield gas 30, an inert gas (inclusive several percentages of $CO_2$ and $O_2$) such as argon or the like is employed in MIG welding, and carbon dioxide is employed in carbon dioxide arc welding. In NAG welding, a mixture of both gases combined in a selected ratio is employed as the shield gas 30. Feed rollers 34 are disposed to feed the electrode wire 31 as the latter melts. In a gas nozzle 35, electric power for arc generation is supplied by means of an electrode chip 36. Designated at 37 is a melted wire, at 38 a melt pond and at 39 a melted metal.

Figure 13:
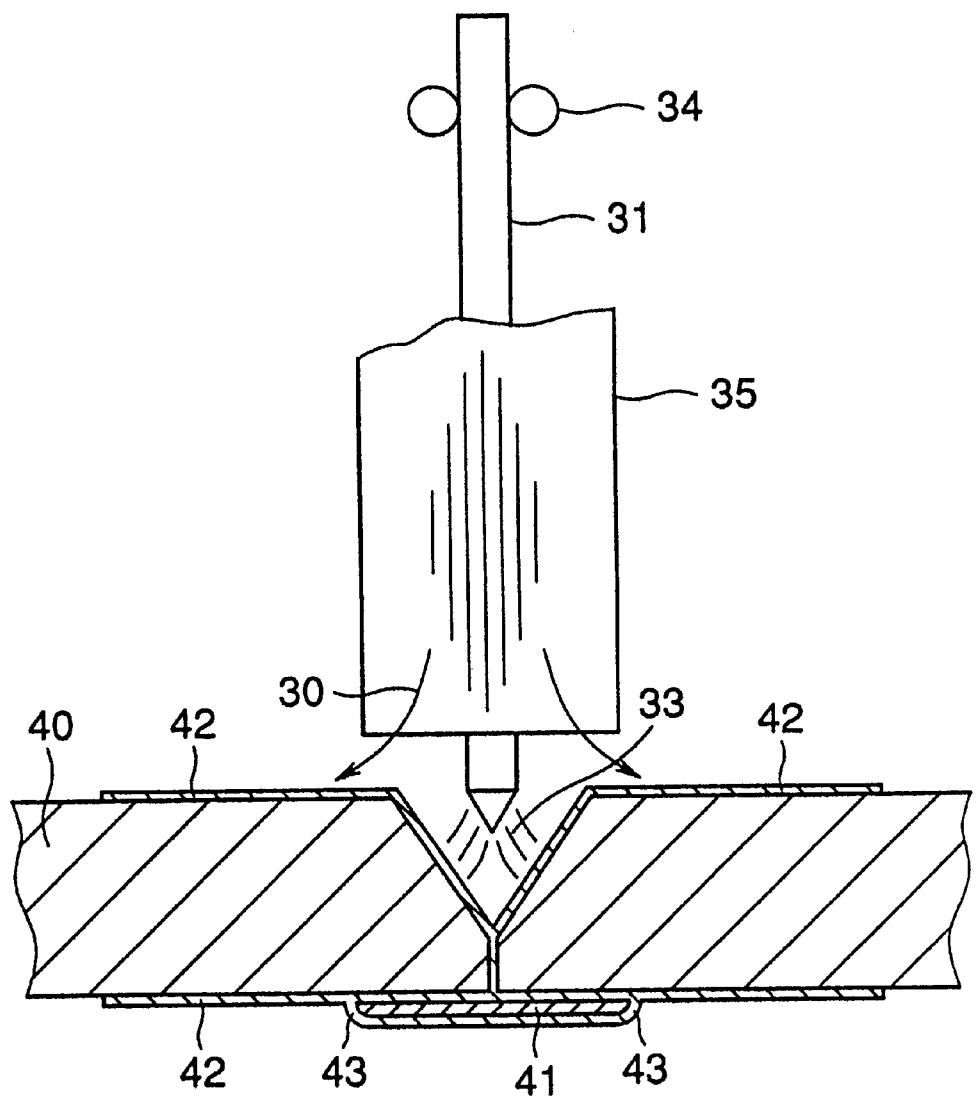
FIG. 13 is a view showing a gas shield underwater welding according to the invention.
Figure 14:
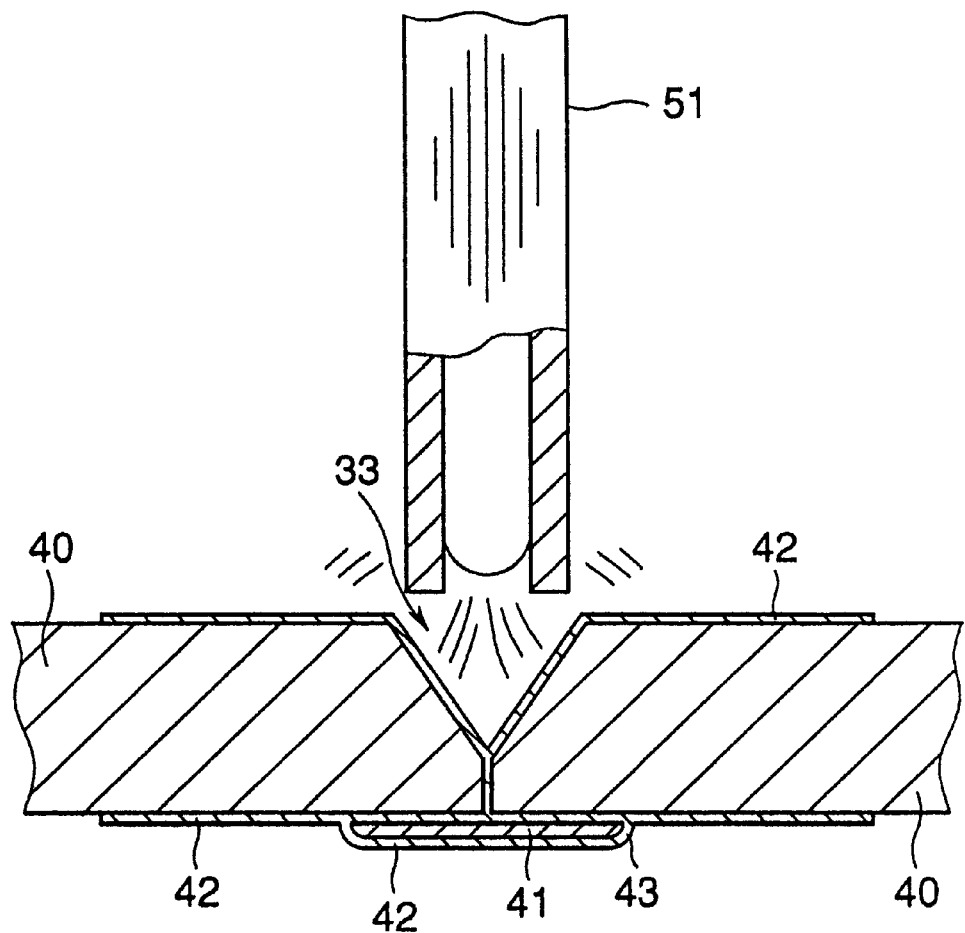
FIG. 14 is a view showing an atmospheric arc welding method according to the invention.

Secondly, the present invention is described in regard to some preferred embodiments in which a hydrophobic treatment technique of the invention has been introduced in a welding area in gas shield welding. These respective embodiments are shown in FIG. 13 and FIG. 14. FIG. 13 is directed to an underwater gas shield welding (applicable of course to welding in the atmospheric), whereas FIG. 14 is directed to an arc welding in which a usual coated welding rod for atmospheric welding is used.

Figure 15:
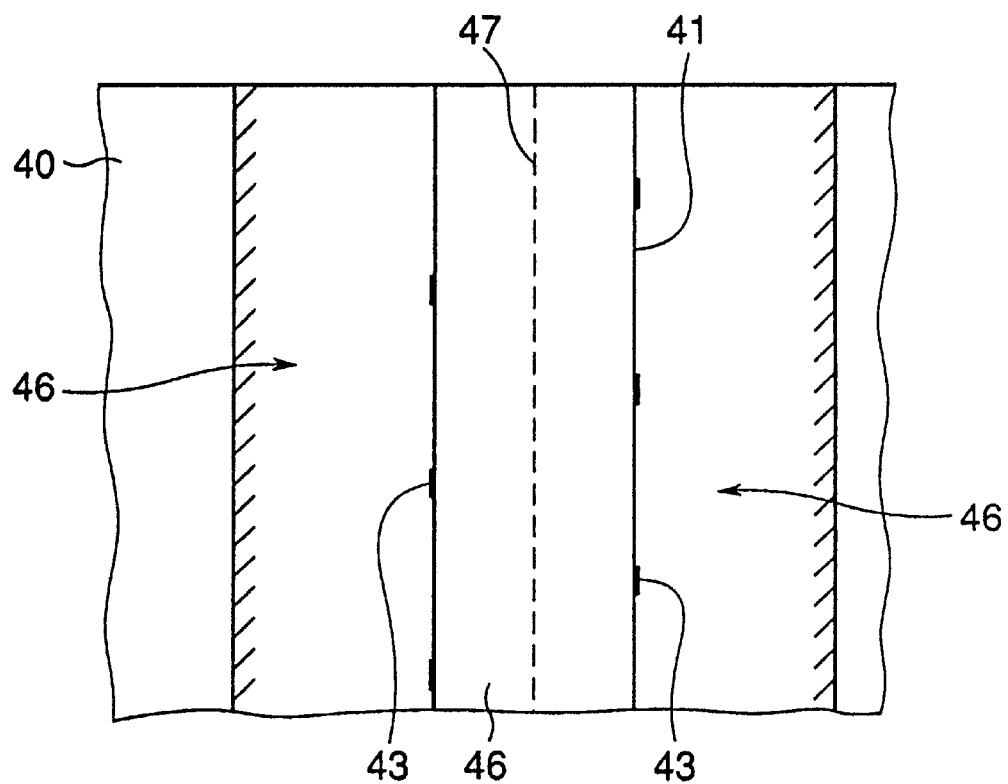
FIG. 15 is a view showing the coating of two mating bevels and a backing metal in the underwater welding of FIG. 13.

Both of the figures illustrate butt welding of those base members having a V-type bevel. In the case of FIG. 13, the base members 40, the backing member 41 and the electrode wire 31 are coated with a coating 42 which, when put into water, can retain an air membrane. Namely, the above-specified slurry-like hydrophobic-treating agent composed of a hydrophobic-treated powder, a resin and a solvent is applied as the coating 42, as seen in FIG. 15, to both surfaces of each of the base members 40 and the backing member 41. The coating 42 may be attained by either one of brushing, spraying and dipping. The extent 46 of each of the base members 40 to be coated may be decided, at will, with the plate thickness and bevel shaping of the base members and other parameters taken in view. The backing member 41 is fixedly attached, via a tack welding 43, to the backsides of the base members 40 where welded. Reference numeral 47 refers to a weldline.

Subsequently, the gas shield welding is set toward the bevelled portion of the welding area, and underwater welding is effected by supplying electric power to the base members 40 and the electrode wire 31, while the shield gas 30 is being flowed through the gas nozzle 35, which shield gas has a higher pressure than the pressure of ambient water. The welding area has on its surface an air membrane formed by the action of the coating 42 and hence does not become moistened so that such area can be protected from adherence of water and foreign matter and also from oxidation caused by dissolved oxygen in the water. Moreover, at from the welding area in its surroundings, water is easily removable by means of the shield gas pressure. In this instance, owing to unique entrapment of the air on the coated surface by the air membrane, the shield gas is also entrapped easily so that complete water tightness is obtainable in the vicinity of the arc, and stable welding is possible in water.

In conducting the tack welding 43 of the backing member 41 in water, underwater arc welding is easily achieved by use of a wire (both coated and uncoated ones useful) filled with a flux 44 illustrated in FIG. 18, or a coated welding rod wound on its outer surface with a water-proof tape or the like. FIGS. 18(a)–(d) illustrate, in cross section, different forms of flux-filled wires, each having the flux 44 filled in a sheath 45. Alternatively, though not shown, a backing member formed of a coated ceramic or the like may be fixedly attached to the backside of a bevelled portion and welded in water, followed by removal of the backing member and by subsequent back waviness welding in water.

Consequently, initial underwater welding is made possible with use of a backing metal or a backing member. If such underwater welding is completed with a certain section unit, the resultant welded section can provide a dry environment (tank), thus making it possible to effectively produce a welded structure in multilayered form by use of a usual atmospheric welding technique.

In the case of FIG. 14, a water-repellent film formed by hydrophobic treatment according to the present invention produces substantially as good results as those obtained with underwater welding in FIG. 13, but with the exception of different welding environments and different welding methods.

Figure 16:
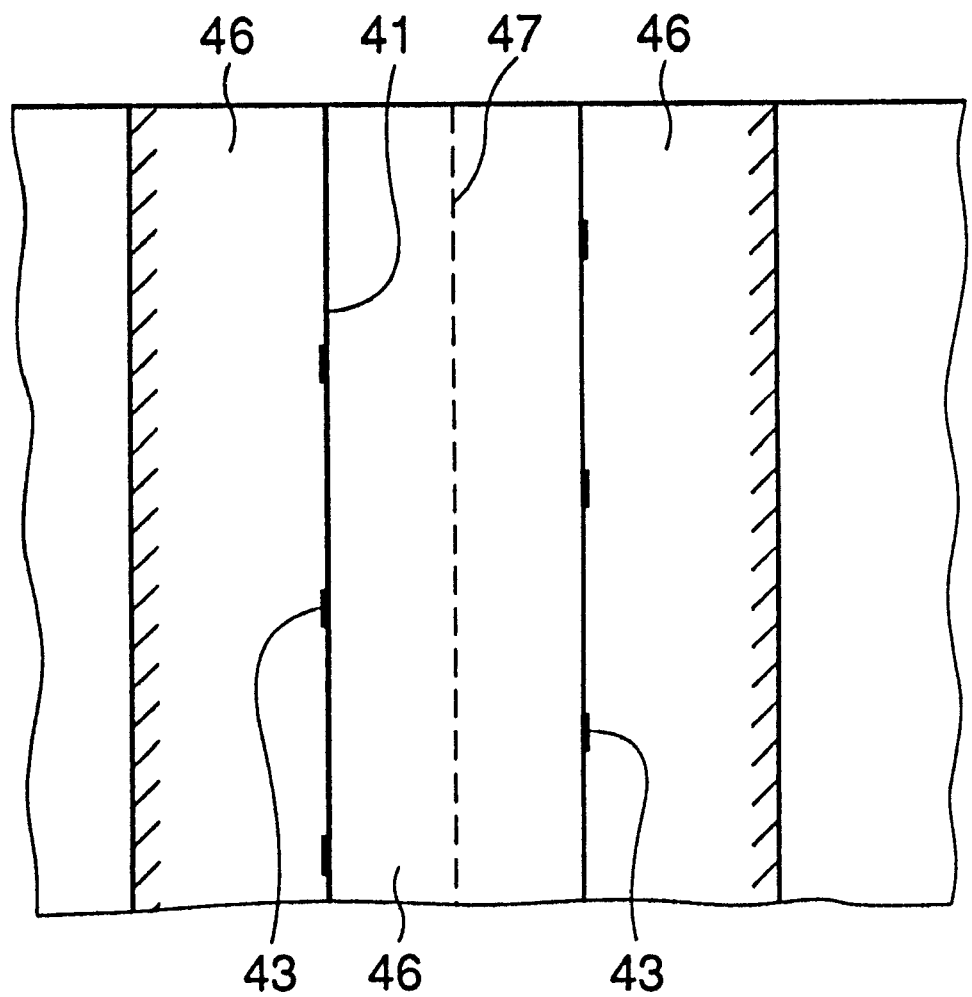
FIG. 16 is a view showing the coating of two mating bevels and a backing metal in the atmospheric welding of FIG. 14.
Figure 18A:
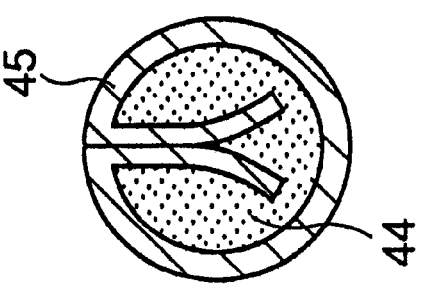
FIGS. 18A through 18D are cross-sectional views showing several forms of a flux-filled wire according to the invention.
Figure 18B:
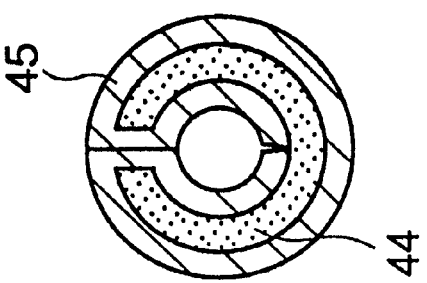
Figure 18C:
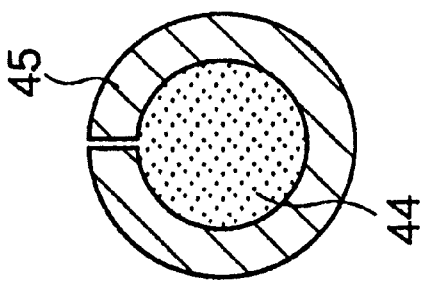
Figure 18D:
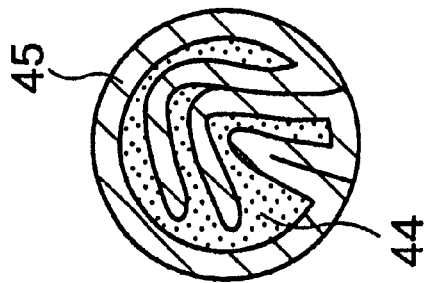

Namely, two base members 40, a backing metal 41 and a coated welding rod 51 are coated with a coating 42 for atmospheric arc welding in FIG. 14. The coating 42 is applied, as seen in FIG. 16, to both surfaces of each of the base members 40 and the backing metal 41. The coating 42 may be derivable by either one of brushing, spraying and dipping. The extent 46 of each of the base members 40 to be coated may be optionally decided with the plate thickness and bevel shaping of the base members and the like taken in view. The backing metal 41 is fixedly attached, via a tack welding 43, to the backsides of the base members 40 where welded.

FIG. 17 illustrates various forms of bevelling shapes at the welding area, (a) referring to I-type welding, (b) to U-type welding, (c) to X-type welding, (d) to H-type welding, (e) to K-type welding and (f) to T-type welding. The invention is basically applicable to all of butt welding, fillet welding and lap welding.

The present invention is further described as to a method in which a welding bevel is prevented from rusting by coating the hydrophobic-treating agent according to the invention to a bevelled portion. After bevelling of the base members, a hydrophobic-treating agent is coated so that pretreatments such as rust prevention and the like may be omitted. Namely, those members to be welded have hitherto been bevelled in advance in plants. Steel materials do not particularly undergo pretreatment in many cases and hence gather rust, consequently requiring rust prevention in situ at the time of welding operation. A tape or the like is sometimes applied to protect a bevelled portion, depending upon the kind of materials used, with eventual need for an extra step of releasing the same before welding operation. Rusting results from condensation of moisture and humidity. Surface application of the hydrophobic-treating agent according to the invention avoids adherence of water and oxidation at a bevelled portion. Additionally, this agent exerts no adverse effect during welding operation and needs no releasing step before welding as in the case of a sealing material.

Figure 19:
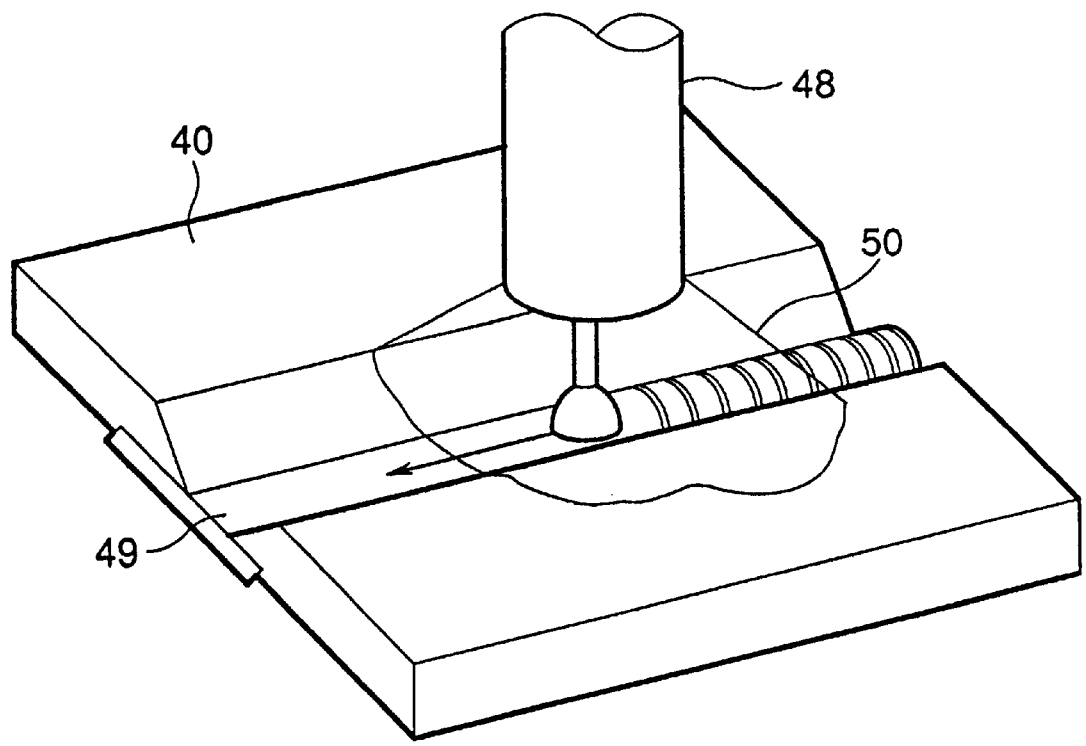
FIG. 19 is a perspective view showing one form of a welding method in which a water screen according to the invention has been practiced.

Further explanation is provided as to a method in which a cavity is easily defined in a water screen during underwater welding. FIG. 19 is a perspective view showing one form of a welding method using a water screen. As shown, the hydrophobic-treating agent mentioned above is coated, by means of a welding torch-water screen nozzle 48, to a bevelled portion 49 of two base members 40 and the surroundings thereof in an extent where a water screen is provided. Due to the tendency of the coated surface to entrap air, a cavity is easily defined in the water screen, and at the same time, the flow rate of a gas used can be reduced.

As described hereinabove, the following conspicuous advantages are achieved by coating the hydrophobic-treating agent of the present invention in the vicinity of a welding area.

(1) A water content is completely removable so that welding is reliably effected with high precision.

(2) The welding area is held in protected condition so that welding is simple at a working site, and welding is speedy.

(3) In water or in a highly humid environment during rainfall, an air membrane is formed on the coating so that welding can be easily effected with high quality, and therefore, welding precision is increased and welding cost decresed.

Embodiment 6

Explanation is provided as to an embodiment in which the welding member of the present invention has been practiced for use as a coated welding rod. The invention is applicable to commercially available coated welding rods such as of an iluminite type, a lime-titania type and a titanium oxide type which have been frequently useful for underwater welding. Hydrophobic treatment is done with respect to the surface of each such coated welding rod such that the latter functions to form an air membrane at a welding area.

Three different hydrophobic-treating agents (A, B and C) were used as indicated below.

hydrophobic-treating agent A: slurry prepared by mixing 50 parts of particulate silica ($SiO_2$ 99%, particle size 2 $\mu$m) as a hydrophobic powder, which silica was hydrophobic-treated with trimethylmethoxysilane, 50 parts of a resin (silicone resin curable at room temperature, solid content 20%) and 200 parts of isopropyl alcohol as a solvent, each such part being by weight.

hydrophobic-treating agent B: solution derived by mixing 20 parts of n-octadecyltrimethoxysilane and 80 parts of n-hexane, each such part being by weight.

hydrophobic-treating agent C: slurry resulting from mixing 60 parts of finely powdered tetrafluoroethylene (particle size 5 $\mu$m) as a hydrophobic powder, 40 parts of bisphenol A-type epoxy resin (product of Three Bond Co.) as a resin and 200 parts of toluene as a solvent, each such part being by weight.

Each of the coated welding rods of iluminite, lime-titania and titanium oxide types was immersed in hydrophobic-treating agents A, B and C for 1 minute and then dried at 50° C. for 24 hours.

The contact angles of the surfaces of the coated welding rods thus hydrophobic-treated with respect to water were about 160 degrees in the case of hydrophobic-treating agent A, about 140 degrees in the case of hydrophobic-treating agent B and about 160 degrees in the case of hydrophobic-treating agent C.

Underwater immersion testing was conducted by allowing the coated welding rods treated with hydrophobic-treating agents A, B and C to stand for 7 days. Measurement was made of the weight of each such covered welding rod before and after testing.

No weight change was confirmed, and this means that each of the treated covered welding rods is immune from being hygroscopic. Further inspection was done with the coating of each treated covered welding rod peeled off, and as a result, it was found that the hydrophobic-treating agent got penetrated from the coated surface of the welding rod into its inside.

Hence, even when the coated surface was subjected to scarring to a slight extent, the water repellency of the coating was not lost.

Figure 20:
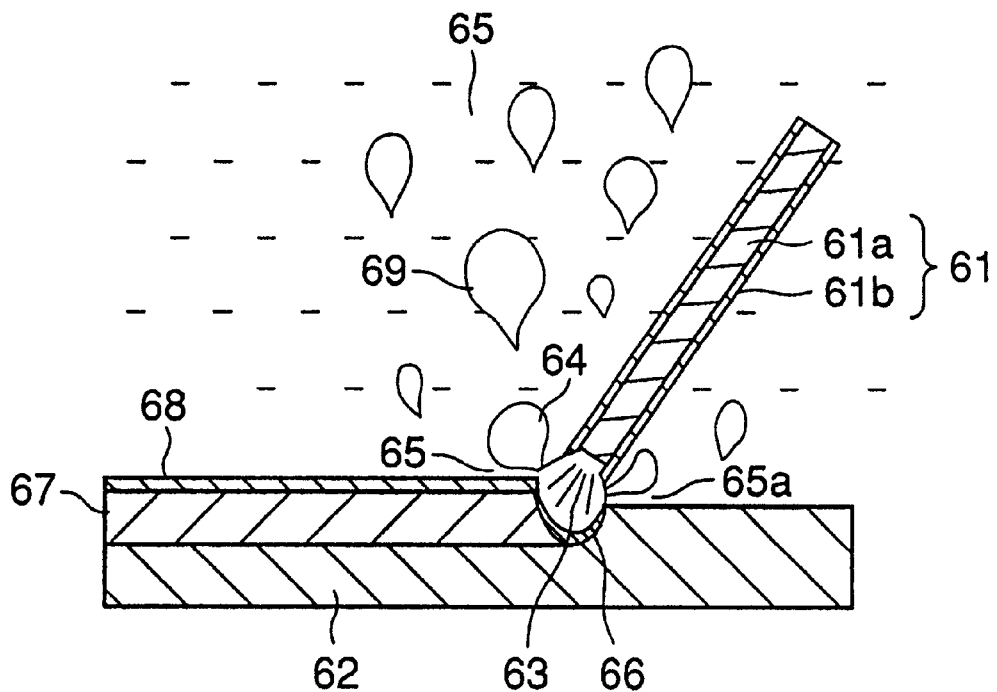
FIG. 20 is a schematic view explanatory of an underwater welding method in which a coated welding rod of the invention has been practiced.

Next, by the use of the covered welding rods treated with hydrophobic-treating agents A, B and C, underwater welding was tested at a depth of 30 cm. Upon immersion in water, each test rod led on its surface to formation of an air membrane. FIG. 20 schematically shows underwater welding using a coated welding rod. The welding is effected with a coated welding rod 61 tilted in a direction of movement as arrowed, while a melt pond 66 is being formed on a base member 62 by an arc 63 generated between the tip of the welding rod 61 and the base member 62.

At the tip of the welding rod 61, the tip of a metallic core wire 61a generating the arc 63 is positioned to be normally deeper than the tip of a coating 61b that is cylindrically shaped.

The cylindrical tip of the coating 61b has a role to act as a protecting cylinder, protecting the arc 63 against an ambient water 65 by means of a gas 64 arising from thermal decomposition of the coating 61*b*. Thus, stable welding is possible. A welded metal 67 formed on the base member 62 is protected by a slug 68 brought by melting of the components of the coating 61*b*. The gas 64 surrounding the arc 63 forcibly pushes out water tending to intrude toward the coating 61*b*, eventually floating up as bubbles 69.

If the coating 61*b* does not undergo hydrophobic treatment and hence becomes moistened and exfoliated, then it loses the protecting cylinder at its tip. This fails to provide an atmosphere of the gas 64 surrounding the arc 63, ultimately allowing the arc 63 to contact directly with water and making the same instable. Further, owing to exfoliation of the coating 61*b*, the welded metal 67 cannot be protected by the slug 68.

This involves frequent weld faults such as fractures arising from oxidation or quenching of the welded metal, blow holes and the metal, blow holes and the like. When the coating 61b absorbs water, a hydrogen gas takes place in the gas 64 protecting the arc 63, which hydrogen gas results from thermal decomposition of the water in the influence of the heat of the arc 63. Such water content gives rise to weld faults such as blow holes and the like.

In the underwater welding test using the hydrophobic-treated coated welding rods according to the present invention, stable welding was attained from all of the coated welding rods treated with hydrophobic-treating agents A, B and C (iluminite, lime-titania and titanium oxide types)

No faults were confirmed at the welded area.

After being immersed in water, the coated welding rod of the invention was taken out of the water, exposed to compressed air blowing and then used for subsequent welding. Stable welding was achieved, and good results were obtained from X-ray inspection of the finished welded area. Thus, durable welding was feasible.

Accordingly, the coated welding rod of the present invention is non-hygroscopic and hence useful for underwater welding as well as land welding. Even in the case of land welding, moistened coating results in weld faults such as blow holes, hydrogen-induced fractures and the like. For these reasons, a coated welding for land welding rod requires strict control and, prior to use, drying in a drying oven to remove control and, prior to use, drying in a drying oven to remove moisture in the case of welding of expensive materials such as high-tension steel and the like. The surface-treated coated welding rod according to the invention is non-hygroscopic, easy to control and useful especially in a highly humid environment (for example, in a ballast tank of a ship, in ocean welding and the like).

The coated welding rod of the present invention is obtained for example by immersing a commercially available coated welding rod in the specified hydrophobic-treating agent so as to provide water repellency. This contributes to easy production, mass production and cost saving. Besides and advantageously, the hydrophobic-treating agent enters the inside of the porous coating so that even when the coating surface gets scarred, the coated welding rod of the invention maintains its water-repellent property and gives good durability in underwater welding operation and in land welding operation where moistening poses a serious defect.

What is claimed is:

1. A welding member having a water-repellent film on at least a partial surface thereof, said water-repellent film (1) having a contact angle of 90 degrees or more with respect to water and (2) forming an air membrane on a surface thereof when said film is immersed in water.

2. The welding member according to claim 1, which is one selected from the group consisting of a welding backing member disposed backside a welding bevel portion, a welding bevel portion of a base member to be welded, and a welding rod having a metallic core wire coated with a flux.

3. The welding member according to claim 1, wherein said water-repellent film contains a hydrophobic powder.

4. The welding member according to claim 3, wherein said hydrophobic powder is either one or both of a polytetrafluoroethylene powder and an inorganic oxide powder surface-treated with a hydrophobic group-containing material.

5. The welding member according to claim 1, wherein said water-repellent film is formed by coating or treating said minute concavities and convexities with a hydrophobic group-containing material.

6. The welding member according to claim 2, wherein said backing material has a substrate formed by fixing a ceramic powder, and said water-repellent film results from surface treatment of said substrate on a surface thereof with a hydrophobic group-containing material.

7. The welding member according to claim 2, wherein said backing material has a flexible substrate, and said water-repellent film is formed of a hydrophobic material.

8. The welding member according to claim 2, wherein said backing material has a substrate formed of a flexible package, and said water-repellent film results from surface treatment of said package on a surface thereof with a hydrophobic group-containing material.

9. The welding member according to claim 8, wherein said package has a particulate flux filled therein, and said particulate flux results from surface treatment of a surface thereof with a hydrophobic group-containing material.

10. The welding member according to claim 2, wherein said water-repellent film of said coated welding rod results from surface treatment of the coated layer of said flux on a surface thereof with a hydrophobic group-containing material.

11. The welding member according to claim 2, wherein said water-repellent film of said welding rod is disposed on the coated layer of said flux and is formed of a hydrophobic powder at least on a surface thereof.

12. The welding member according to claim 1, wherein said at least a partial surface contains concavities and convexities of from about 2 nm to about 200 $\mu$m in size.

* * * * *